(12) United States Patent
Saito

(10) Patent No.: US 6,421,373 B1
(45) Date of Patent: Jul. 16, 2002

(54) SPREAD SPECTRUM WIRELESS COMMUNICATIONS DEVICE

(75) Inventor: Naritoshi Saito, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/467,080

(22) Filed: Dec. 20, 1999

(30) Foreign Application Priority Data

Dec. 21, 1998 (JP) ............................................ 10-362783

(51) Int. Cl.[7] .......................... H04B 15/00; H04K 1/00; H04L 27/30
(52) U.S. Cl. ........................................ 375/148; 375/150
(58) Field of Search ................................. 375/130, 140, 375/141, 142, 144, 145, 147, 148, 149, 150, 151; 370/331, 332, 336, 337, 480, 491, 498, 500

(56) References Cited

U.S. PATENT DOCUMENTS 5,109,390 A * 4/1992 Gilhousen et al. .......... 370/335
6,026,115 A * 2/2000 Higashi et al. .............. 375/200
6,078,570 A * 6/2000 Czaja et al. ................. 370/331

* cited by examiner

*Primary Examiner*—Chi Pham
*Assistant Examiner*—Phuong Phu
(74) *Attorney, Agent, or Firm*—Finnegan, Henderson, Farabow, Garrett & Dunner, L.L.P.

(57) ABSTRACT

There is disclosed a spread spectrum wireless communications device capable of conducting a pilot search for a frequency different from the traffic-channel frequency used in a conversation while suppressing deterioration of voice quality. One frame is selected from every 5 frames such that the selected frames are not adjacent to each other. The reception frequency (searched frequency) is switched from frequency f1 used for communication to other frequency f2 during the period of any one of the selected frames. During the periods (e.g., $N_{1-1}$, $N_{1-2}$, and $N_{1-3}$) of plural ones (e.g., 3 frames) of the frames in which f2 is being received, neighboring sets are searched for phases continuously.

14 Claims, 15 Drawing Sheets

SPREAD SPECTRUM WIRELESS COMMUNICATIONS DEVICE

BACKGROUND OF THE INVENTION

1. Field of the Invention

The present invention relates to a spread spectrum wireless communications device used in a cellular phone, a portable telephone system, a cordless telephone system, or a wireless LAN system and, more particularly, to a spread spectrum wireless communications device enabling code division multiple access (CDMA) communications using a spread spectrum method.

2. Description of the Related Art

In recent years, spread spectrum techniques that are robust against interferences and jamming have attracted attention as one wireless communications method used in mobile communications systems. Portable telephones according to U.S. standard IS-95 have started to be used in Korea, in USA as well.

In the USA where such services are provided in practice, the frequency of the base station differs according to each individual service provider. Where a hard handoff of a mobile station occurs between base stations using such different frequencies, dropped calls take place frequently, thus presenting a problem.

Referring to FIG. 14, a first service provider uses a base station BS1. A mobile station MS using a frequency f1 is connected with the base station BS1. A second service provider has a base station BS2 using a frequency f2 different from the frequency f1. If the mobile station MS moves to a cell of the base station BS2 of the second service provider, a hard handoff occurs without actually searching for the phase of the PN code of the signal from the base station BS2 by a searcher. Therefore, if a base station with a PN offset carried by a message sent from the base station BS1 is not available, or if the PN code shifts by more than 0.5 chip by the effects of the wireless path, dropped calls occur.

Accordingly, the U.S. Telecommunications Industries Association (TIA) recommend that a pilot search of base stations using different frequencies be conducted during a conversation (traffic channel), which constitutes improvement of an IS-95 system. However, if such a pilot search is carried out, the reception frequency must be changed to a frequency different from the frequency of the traffic channel. Consequently, during time intervals in which the reception frequency has been modified in this way, it is impossible to receive the frequency of the current conversation.

With the IS-95 method, the chip rate is 1.2288 MHz. It is assumed that the window length searched by a searcher at a different frequency given from the base station is ±120 chips and that the searcher has only one complex correlator. If integration is performed over 16 symbols per one PN code phase, the time required for the pilot search is 16 symbols× 64 chips×240 chips (window length)÷1.2288 M=200 msec Since 1 frame is 20 msec, the above-described time corresponds to 8 frames. It follows that the voice of the conversation of the current traffic channel cannot be received during the periods of 8 successive frames. In the calculation described above, it is assumed that the searcher has only one complex correlator. If it has four complex correlators, the time corresponds to 8÷4=2.5 frames. Eventually, three consecutive frames cannot be received.

FIG. 15 illustrates this situation, i.e., a pilot search is carried out over 3 frames. In this FIG., A(A1, A2) is an active set and represents the PN offset of a presently busy channel (T-channel). C(C1, C2, C3) is a candidate set and indicates the PN offsets of base stations that are not busy but have reception levels greater than a threshold value. N(N1) is a neighboring set and indicates the PN offsets of base stations that are included in a neighboring list and have reception levels not exceeding the threshold value. R(R1, R2) is a remaining set and indicates the PN offsets of other base stations.

In the configuration shown in FIG. 15, the active setA(A1, A2) of the frequency f1 is first searched. Then, the candidate set C(C1, C2) is searched for pilots. Subsequently, the reception frequency is switched to f2, and the neighboring set N1 is searched. If this state persists during the period of 3 frames and the search of the neighboring set N1 ends, the reception frequency is returned to f1. In this way, the frequency of the current conversation cannot be received over the periods of 3 frames. In consequence, the voice speech is interrupted.

Where the mobile station is at the boundary between the coverage areas of adjacent base stations, it may be necessary to search numerous candidate sets for pilots. In the past, individual candidate sets are searched in succession. Hence, it takes a long time to complete the search of all the candidate sets for pilots.

As described thus far, in the prior art search of neighboring sets for pilots, voice is interrupted over 3 frames, resulting in auditory unnaturalness. Also, in search of numerous candidate sets for pilots, it takes a long time to complete the search.

SUMMARY OF THE INVENTION

In view of the foregoing circumstances, the present invention has been made. It is a first object of the present invention to provide a spread spectrum wireless communications device capable of conducting a pilot search for frequencies different from a traffic channel frequency during a conversation while suppressing deterioration of voice quality.

It is a second object of the invention to provide a spread spectrum wireless communications device capable of conducting a pilot search of numerous candidate sets in a short time.

The object described above is achieved in accordance with the teachings of the invention by a spread spectrum wireless communications device used in a spread spectrum mobile communications system having base stations using different frequencies, said wireless communications device comprising:

receiver means for receiving first signals transmitted over a first frequency used by a first base station;

reception frequency control means for controlling said receiver means so as to receive second signals transmitted over a second frequency used by a second base station during periods of discretely selected frames; and phase search means for searching pseudorandom code phases of the received second signals in response to the reception frequency control means.

DESCRIPTION OF THE PREFERRED EMBODIMENTS

First Embodiment

Figure 1:
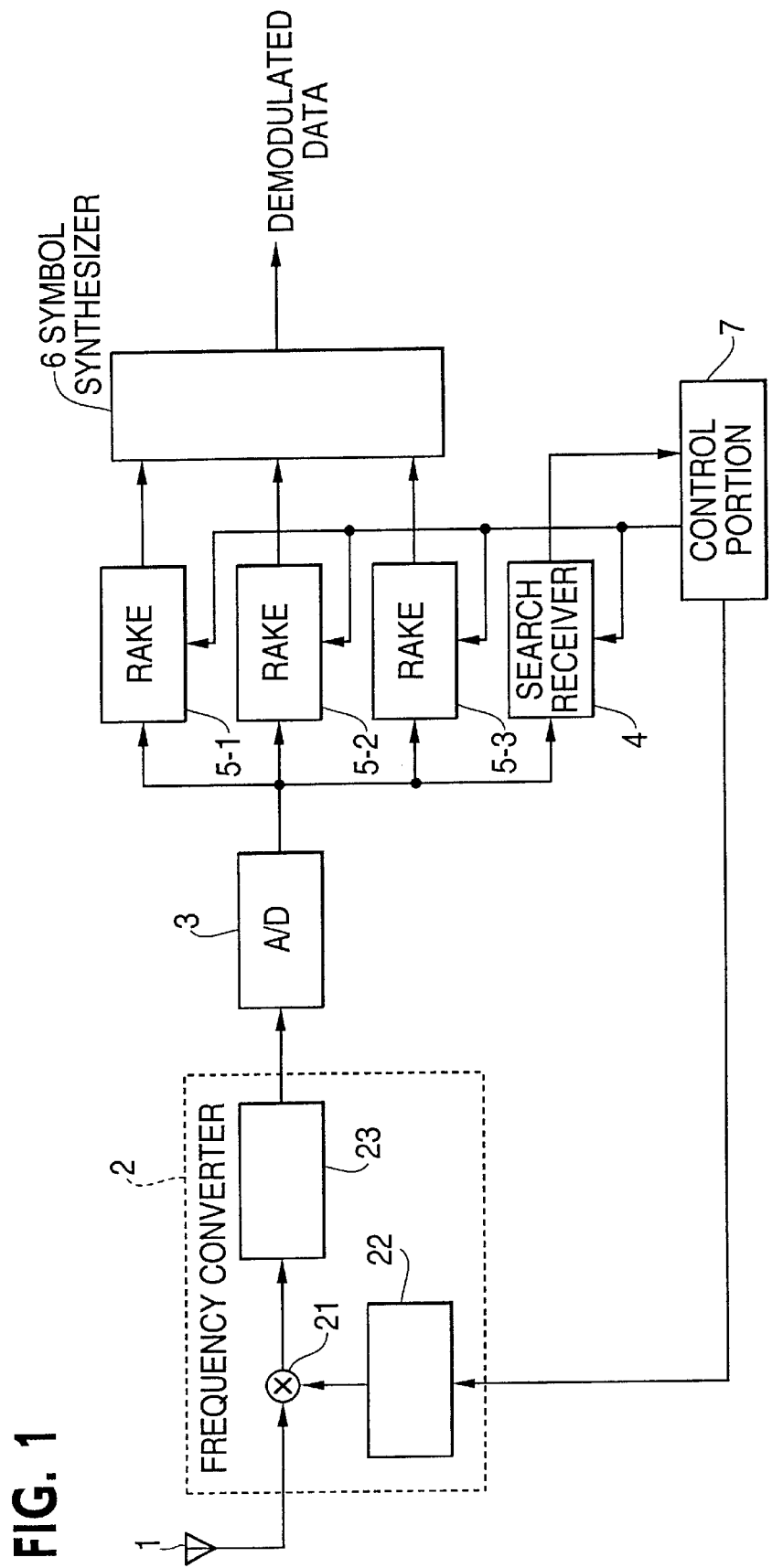
FIG. 1 is a block diagram of main portions of a spread spectrum wireless communications device in accordance with a first embodiment of the invention.

FIG. 1 is a block diagram showing main portions of a spread spectrum wireless communications device in accordance with a first embodiment of the invention. This communications device comprises an antenna 1, a frequency converter portion 2, an A/D converter portion 3, a search receiver 4, a rake receiver 5, a symbol synthesizer 6, and a control portion 7. The rake receiver 5 consists of three receiver elements 5-1, 5-2, and 5-3.

Wireless signals are received by the antenna 1 and supplied to the frequency converter portion 2. This converter portion 2 has a mixer 21, a synthesizer 22, and a filter/amplifier 23. Wireless signals supplied from the antenna 1 are combined with a local oscillator signal by the mixer 21, the local oscillator signal being produced by the synthesizer 22 under instructions of the control portion 7. The wireless signals are converted into base-band frequencies and amplified by the filter/amplifier 23 with low noise.

A reception signal in the base band obtained by the frequency converter portion 2 in this way is fed to the A/D converter portion 3 and sampled at a given sampling rate. For example, this sampling rate is set to a value that is eight times the chip rate of PN (pseudo noise) codes.

The reception signal sampled by the A/D converter portion 3 is applied to the search receiver 4 and to the three elements of the rake receiver 5. The search receiver 4 searches the pilot signal included in the applied, received signal for phases of PN codes. This search will be referred to as the PN search below. The results are sent to the control portion 7.

Each element of the rake receiver 5 de-spreads the spectrum of the reception signal supplied from the A/D converter portion 3 and demodulates the original data sent from a base station (not shown), using the PN codes of a phase specified by the control portion 7.

Data demodulated by the elements of the rake receiver 5 are supplied to the symbol synthesizer 6 and combined in synchronism. Thus, demodulated data undergone path diversity is obtained.

The rake receiver 5 has three elements, because multipath is received at a high S/N using the path-diversity effect, and because a soft handoff is carried out, i.e., the connected base station is switched without interrupting the wireless channel during a conversation. These are realized by appropriately controlling the PN phases used in the elements of the rake receiver 5 by the control portion 7.

The control portion 7 consists mainly of a microprocessor, for example, and controls every portion of this spread spectrum wireless communications device. In particular, the control portion 7 commands a frequency to be generated by the synthesizer 22, controls the operation of the search receiver 4, gives instructions about the PN phases to the elements of the rake receiver 5, and other well-known control operations in the wireless communications device. In addition, the control portion has a control means for conducting a pilot search (hereinafter referred to as the different frequency search) for a frequency different from the traffic-channel frequency during a conversation in a procedure described later.

The operation of the spread spectrum wireless communications device constructed as described thus far is next described. The feature of the operation of the spread spectrum wireless communications device in accordance with the present embodiment lies in the procedure for the different frequency search. The spread spectrum wireless communications device is similar to the prior art spread spectrum wireless communications device in other operations and so the following description centers on the operation concerning the different frequency search.

Figure 2:
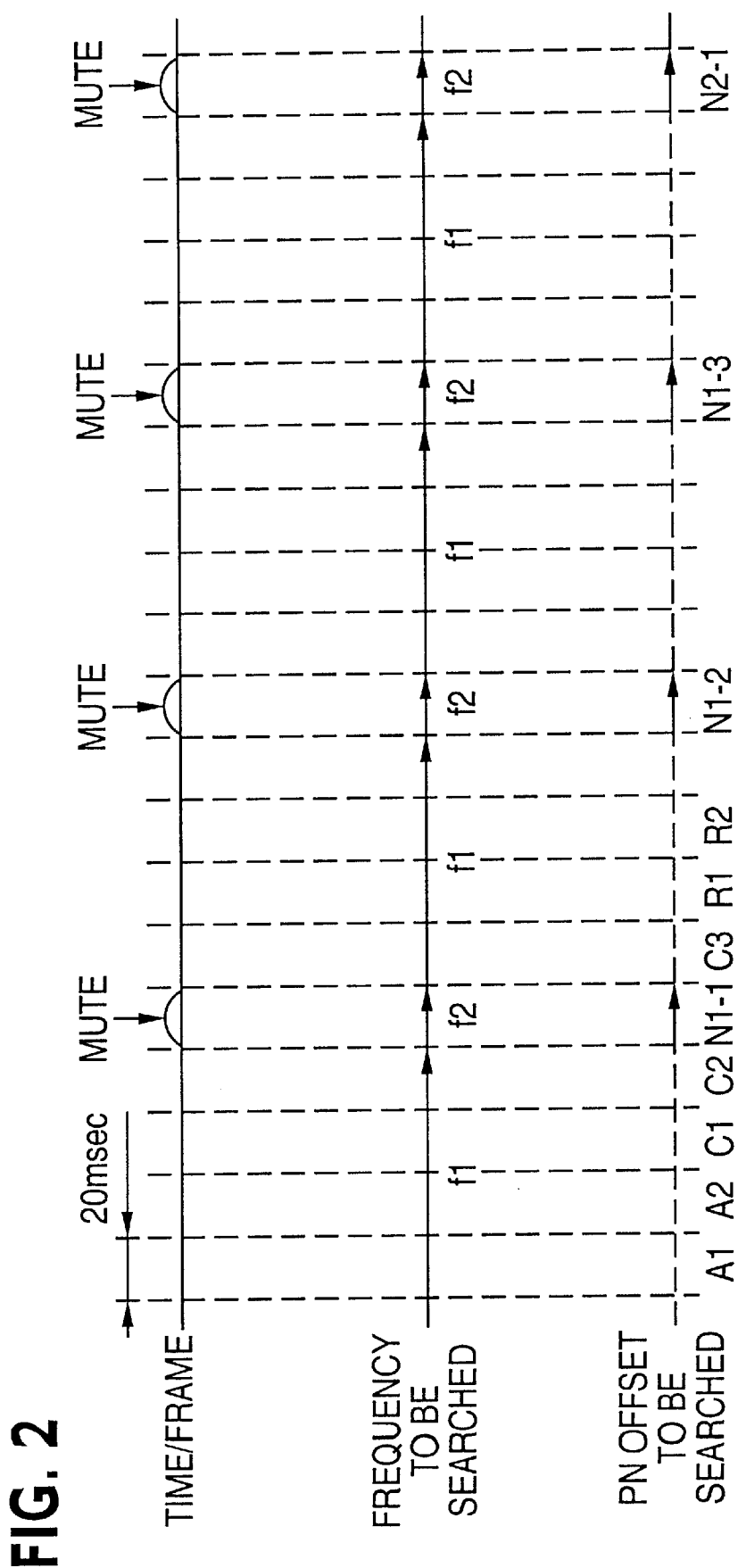
FIG. 2 is a diagram illustrating the manner in which a PN search is conducted in accordance with the first embodiment of the invention.

The control portion 7 instructs the synthesizer 22 to change its local generator signal to f2 only during the periods of 1 frame every 4 frames during a conversation using a frequency f1. In this way, the reception frequency at which the search receiver 4 conducts a PN search varies as shown in FIG. 2.

The control portion 7 controls the search receiver 4 to conduct a PN search over a window length corresponding to 240 (±120) chips using 3 frames with the reception frequency f2. Specifically, 240 chips are equally divided into three. A PN search is carried out during the period of each frame with the reception frequency f2 across 80 chips. That is, the first 80 chips are searched in $N_{1-1}$ in FIG. 2. The next 80 chips are searched in $N_{1-2}$. The final 80 chips are searched in $N_{1-3}$.

The search receiver 4 has four complex correlators and is able to conduct PN searches across 2 chips simultaneously. Accordingly, the time taken to search 80 chips is approximately the period of 0.83 frame. Consequently, the search can be completed within the period of one frame.

In the present embodiment, mute frames are generated discretely. Quite short interruptions take place discretely. In consequence, auditory unnaturalness is reduced.

Second Embodiment

Figure 3:
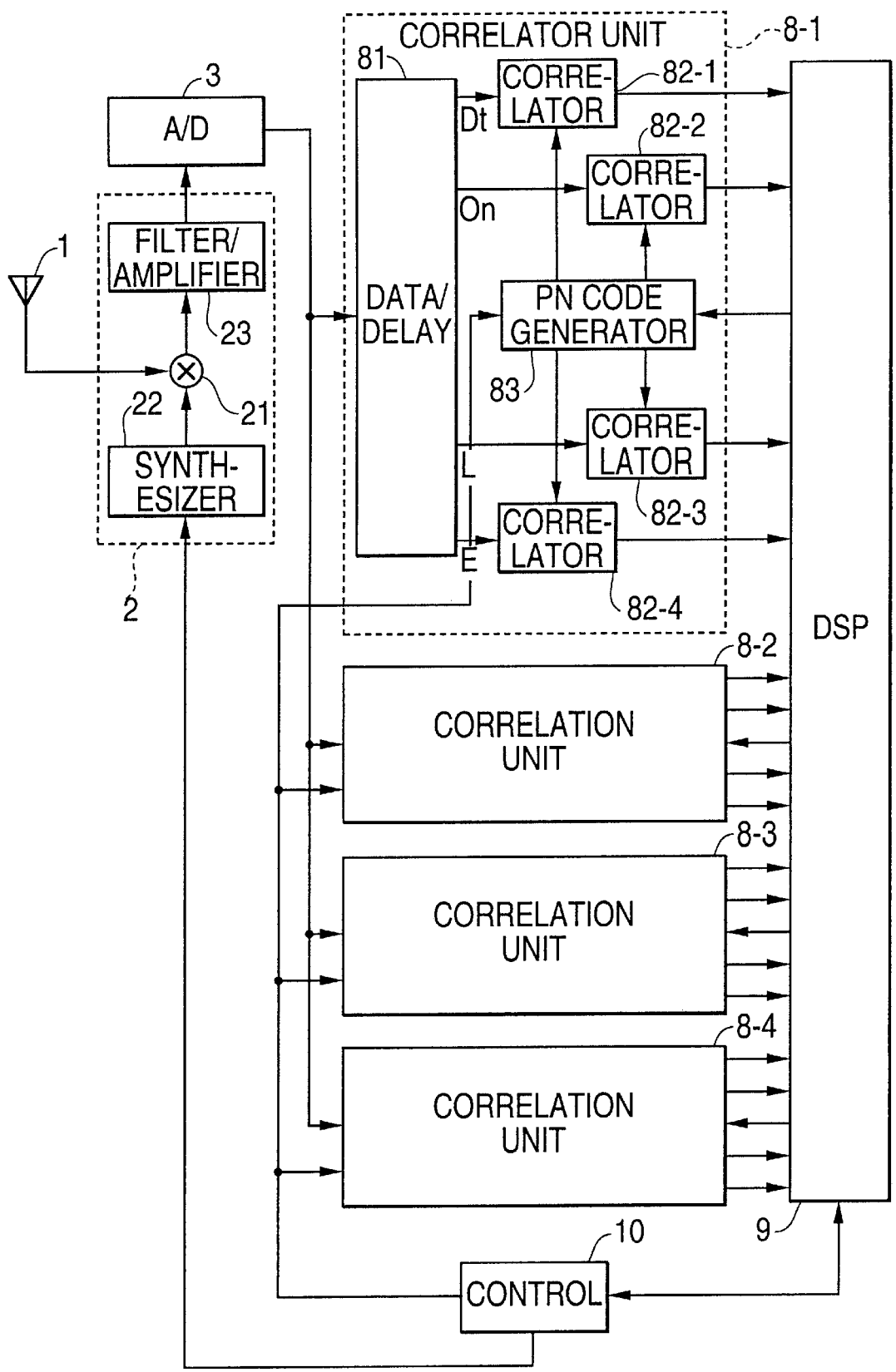
FIG. 3 is a block diagram of main portions of a spread spectrum wireless communications device in accordance with a second embodiment of the invention.

FIG. 3 is a block diagram showing main portions of a spread spectrum wireless communications device in accordance with the second embodiment of the present invention. It is to be noted that like components are indicated by like reference numerals in various figures and that those components which have been already described will not be described in detail below.

As shown in FIG. 3, this spread spectrum wireless communications device has an antenna 1, a frequency converter portion 2, an A/D converter portion 3, four correlation units 8 (8-1 to 8-4), a digital signal processor (DSP) 9, and a control portion 10.

The correlation units 8-1 through 8-4 are identical in structure. Each correlation unit has a data delay portion 81, four complex correlators 82 (82-1 to 82-4), and a PN code generator 83. In FIG. 3, only the structure of the correlation unit 8-1 is shown particularly. Detailed structures of the other correlation units 8-2 to 8-4 are omitted.

The reception signal sampled by the A/D converter portion 3 is applied to the correlation units 8. Within each correlation unit 8, the supplied reception signal is applied to the data delay portion 81.

Figure 4:
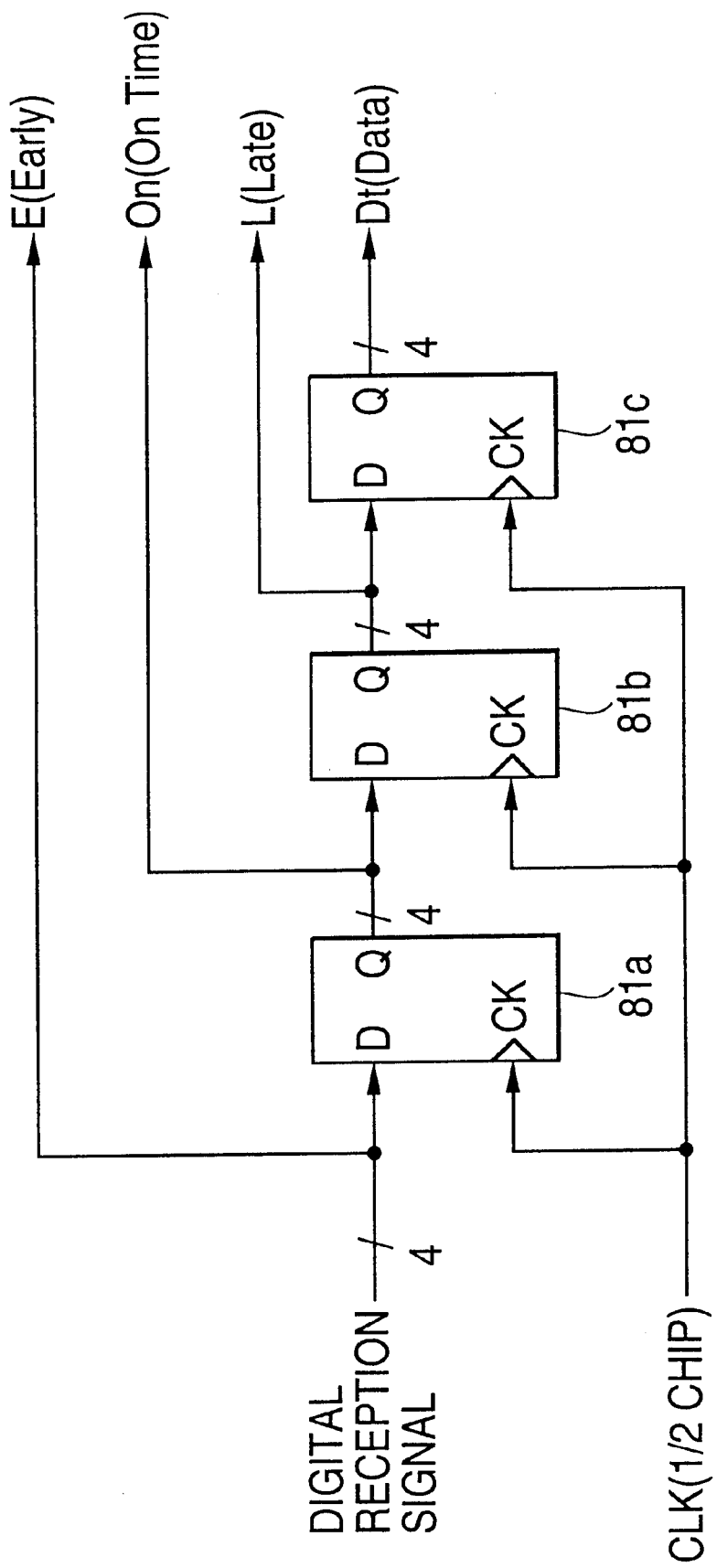
FIG. 4 is a block diagram of a data delay portion 81 shown in FIG. 3.

As shown in FIG. 4, each data delay portion 81 consists of 3 D type flip-flops 81a, 81b, and 81c connected in series. Clock signals CLK having periods corresponding to ½ chip of their respective PN codes are applied to the flip-flops 81a, 81b, and 81c. The D type flip-flops delay the input reception signals by an amount corresponding to ½ chip.

Figure 5:
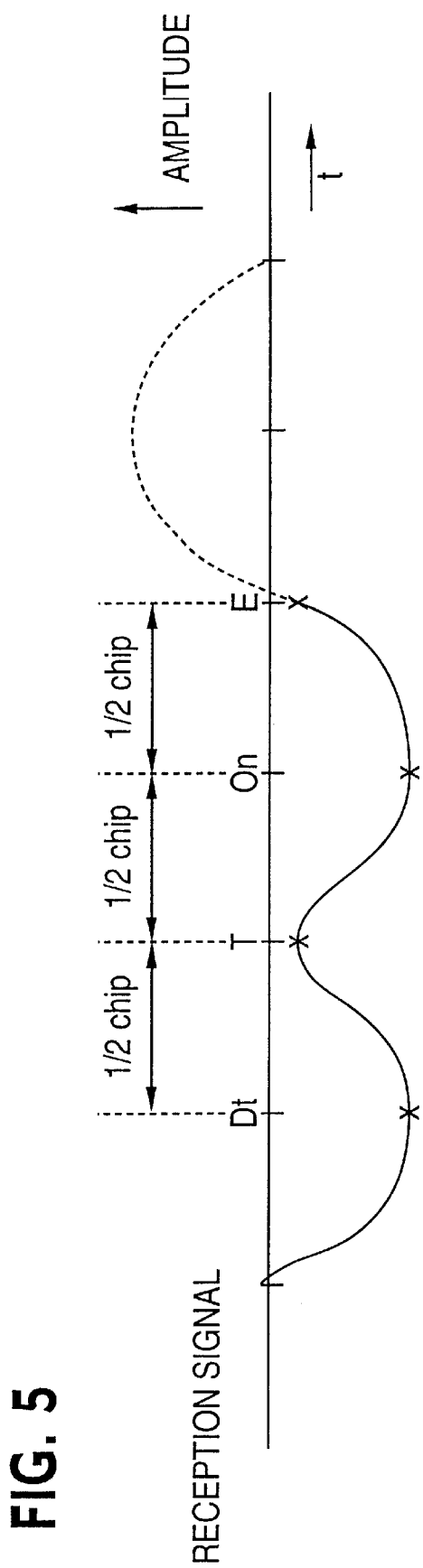
FIG. 5 is a diagram illustrating the phase relation among rates delivered from the data delay portion 81 shown in FIGS. 3 and 4.

The input to the flip-flop 81a, the output from the flip-flop 81a, the output from the flip-flop 81b, and the output from the flip-flop 81c are delivered as reception signals with rates of E(Early), On (On Time), L (late), and Dt (Data), respectively. These rates have phase relations as shown in FIG. 5.

With respect to the reception signals with rates generated by the data delay portions 81, the Dt rate is applied to the complex correlator 82-1. The On rate is applied to the complex correlator 82-2. The L rate is applied to the complex correlator 82-3. The E rate is applied to the complex correlator 82-4.

Figure 6:
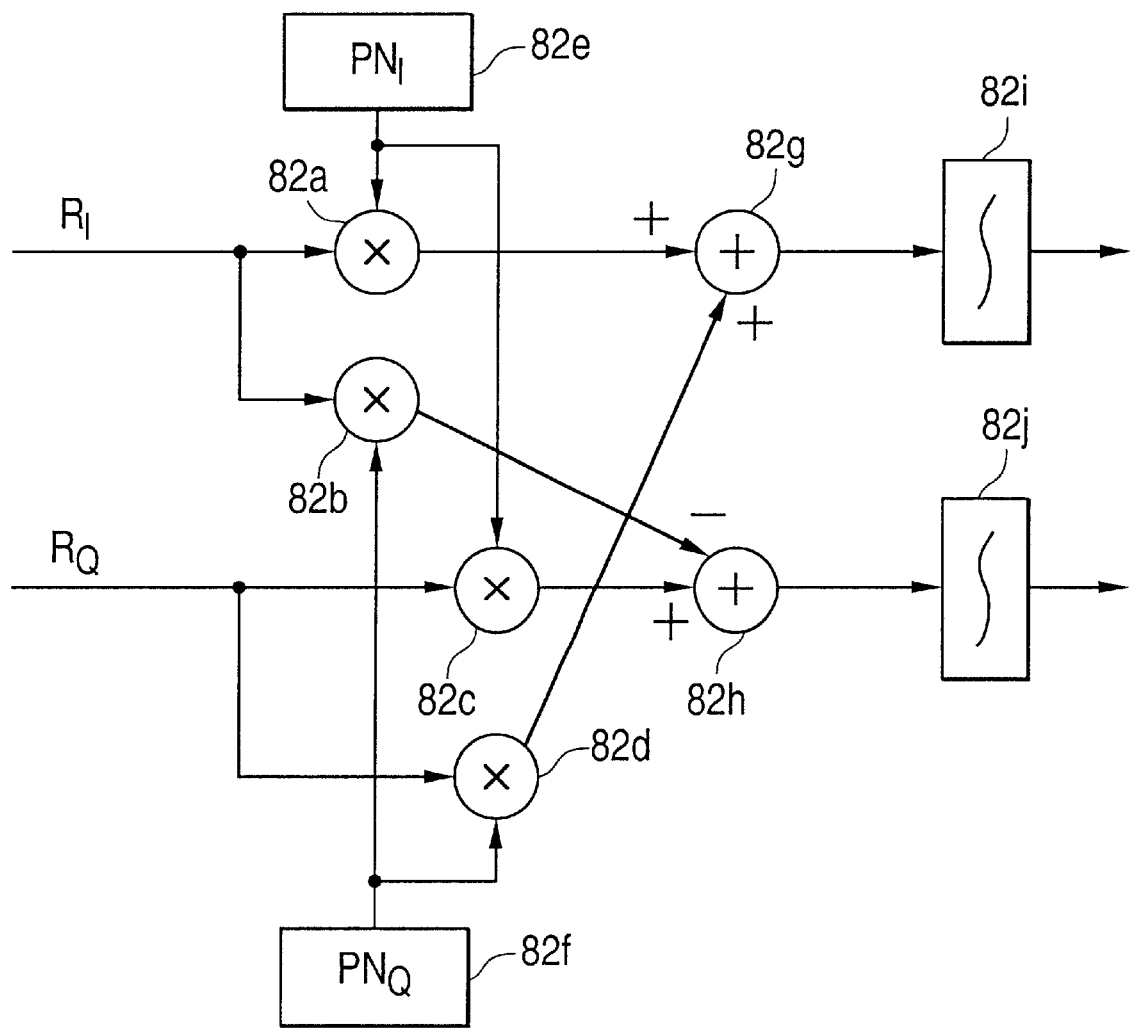
FIG. 6 is a block diagram of a complex correlator 82 shown in FIG. 3.

Each complex correlator 82 is constructed as shown in FIG. 6. That is, the correlator 82 comprises multipliers 82a, 82b, 82c, 82d, a PN converter 82e for I sequence, a PN converter 82f for Q sequence, adders 82g, 82h, and integrators 82i, 82j and is generally used in an IS-95 system. Details are described in "CDMA Principles of Spread Spectrum Communications", by A. Viterbi, Addison Wesley Publishing, pp. 42.

Each of these complex correlators 82 takes the correlation between a reception signal and a PN code and produces a correlation output according to the magnitude of the correlation. The correlation outputs from the correlators 82 are applied to the DSP 9.

The PN code generator 83 generates a PN code with a phase indicated by the control portion 10 and sends it to the complex correlator 82. The PN code generator 83 varies the phases of the PN codes sent to the complex correlators 82, respectively, under control of the DSP 9.

The mode of operation of the DSP 9 can be switched between a demodulation mode and a different frequency search mode, depending on instructions from the control portion 10. Where operating in the demodulation mode, the DSP 9 performs various kinds of processing including search for multipath, tracking of the phase of the PN code used in each complex correlator 82, and processing regarding demodulated data components. When operating in the different frequency search mode, the DSP 9 calculates the pilot energy and performs processing regarding neighboring sets of influential strong signals.

The control portion 10 controls all the portions of the present spread spectrum wireless communications device to thereby realize the operation of a spread spectrum wireless communications device. This control portion 10 consists principally of a microprocessor. The control portion has control means for switching the mode of operation of the device between the demodulation mode and the different frequency search mode during communication and providing control according to the mode, in addition to general, well-known control means for a spread spectrum wireless communications device of this kind.

The operation of the spread spectrum wireless communications device constructed as described thus far is now described. The feature of the operation of this device lies in the procedure for different frequency search. This device is similar to the prior art spread spectrum wireless communications device in other operations and so the description given below will center on the operation regarding the different frequency search.

Figure 7:
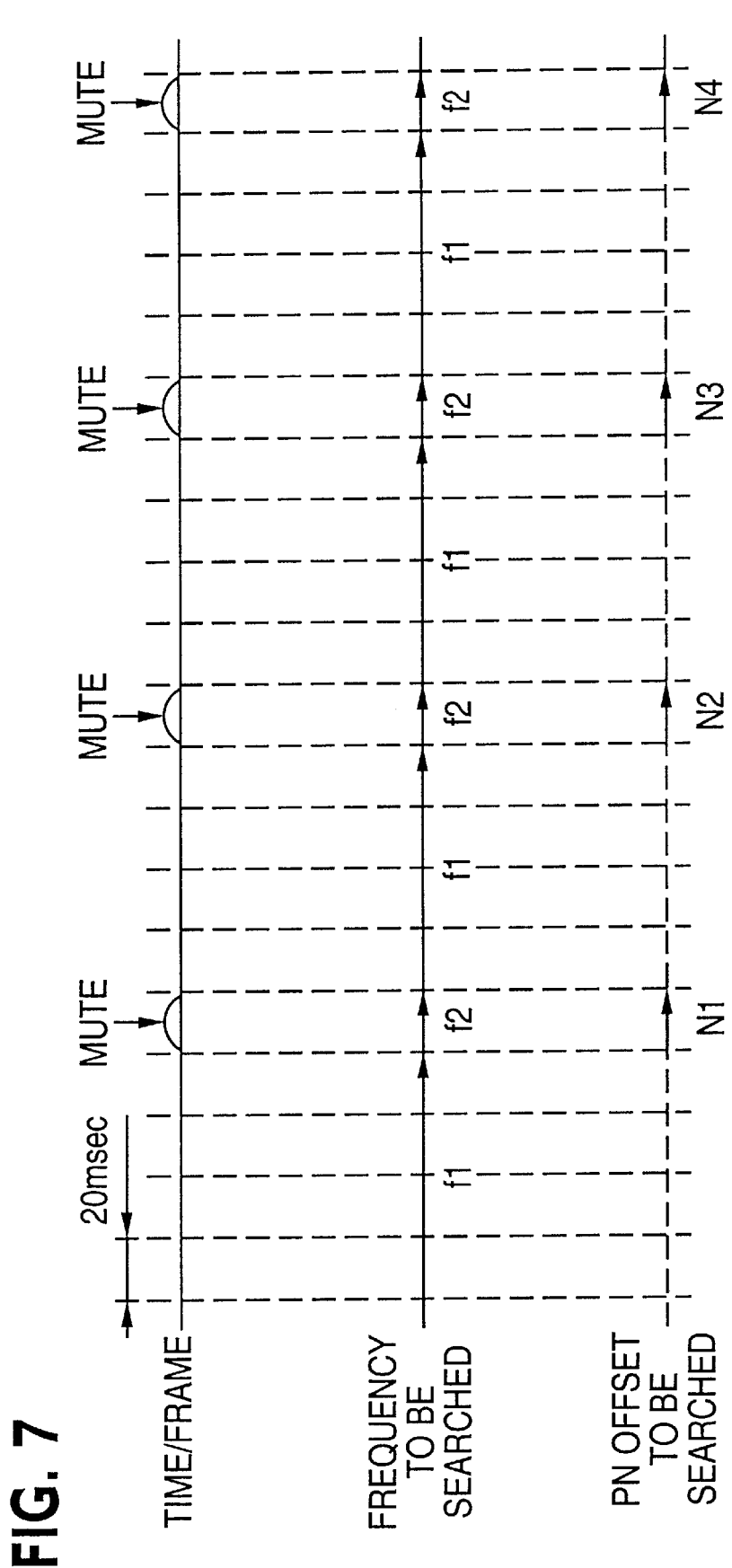
FIG. 7 is a diagram illustrating the manner in which a PN search is conducted in accordance with the second embodiment of the invention.

The control portion 10 instructs the synthesizer 22 to modify the frequency of its local oscillator signal to f2 only during the period of one frame every four frames, during a conversion using frequency f1. In this way, the reception frequency at which the search receiver 4 conducts a PN search varies as shown in FIG. 7.

Figure 8:
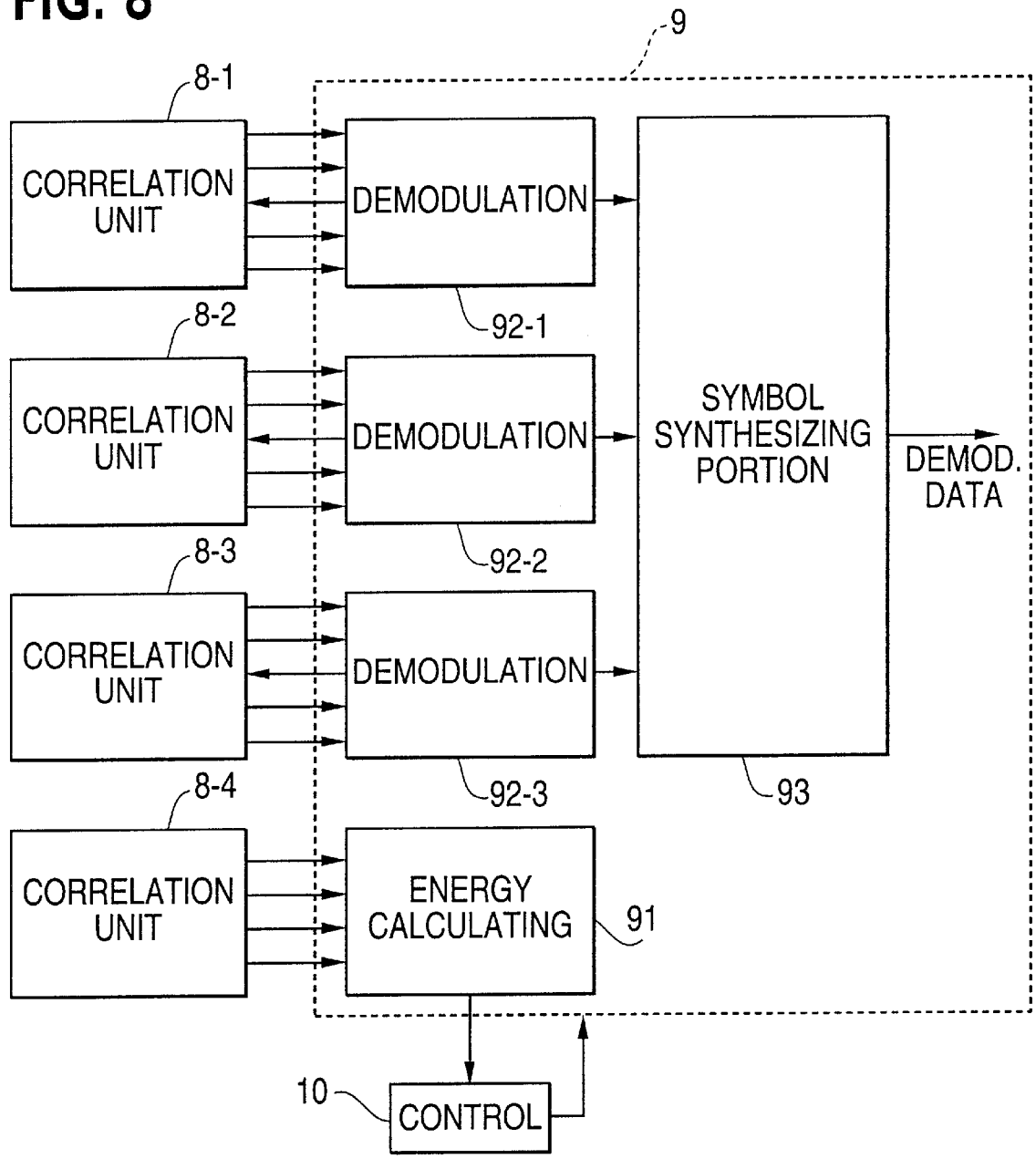
FIG. 8 is a schematic block diagram of a configuration realized by the functions of a DSP (digital signal processor) 9 in a demodulation mode.

While the reception frequency is f1, the control portion 10 sets the mode of operation of the DSP 9 to the demodulation mode. At this time, the DSP 9 functions as shown in FIG. 8. In particular, when the demodulation mode is established, the DSP 9 realizes the functions of an energy-calculating portion 91, three demodulation-processing portions 92 (92-1 to 92-3), and a symbol-synthesizing portion 93.

Figure 9:
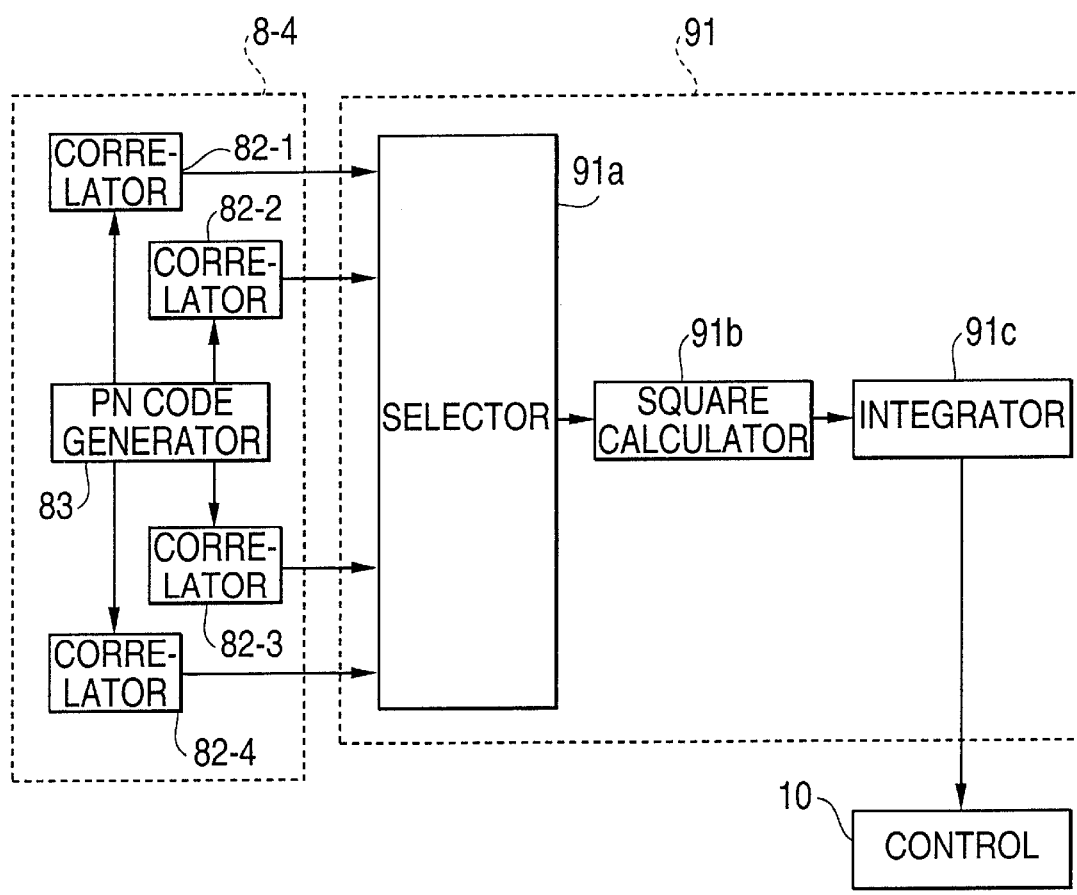
FIG. 9 is a schematic block diagram of an energy-calculating portion 91 shown in FIG. 8.

The energy-calculating portion 91 finds the energy of the reception signal from the correlation outputs from the correlation units 8-4, and performs functions of a selector 91a, a square calculator 91b, and an integrator 91c as shown in FIG. 9.

The selector 91a selectively supplies the correlation outputs from the four complex correlators 82 included in corresponding the correlation units 8 (in this example, unit 8-4) to the square calculator 91b. This calculator 91b takes the square of the correlation output supplied via the selector 91a and sends the results to the integrator 91c. The integrator 91c integrates the value obtained from the square calculator 91b over predetermined periods (for example, periods of 16 symbols) and sends the results as a pilot signal energy value to the control portion 10.

Figure 10:
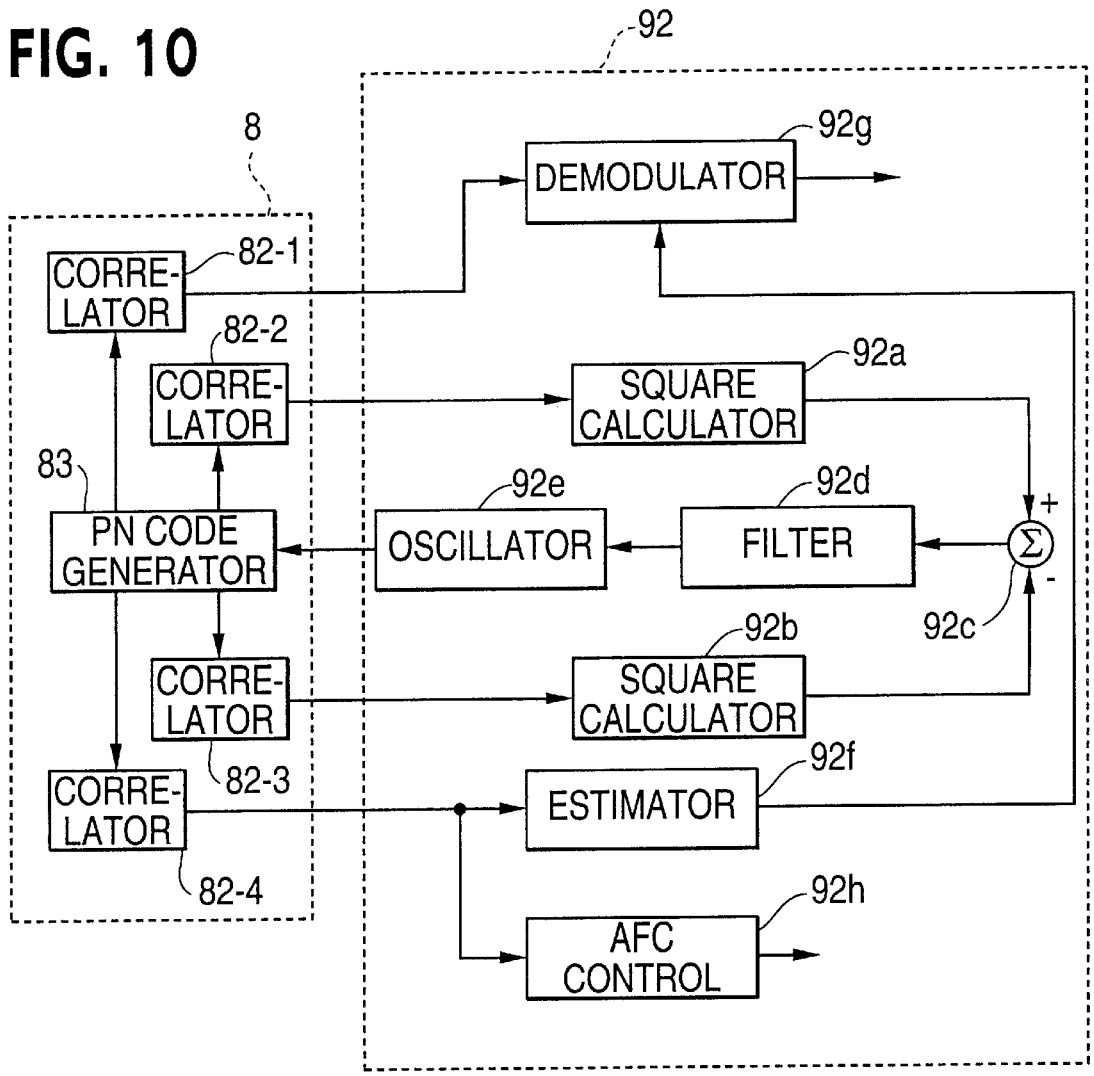
FIG. 10 is a schematic block diagram of a demodulation-processing portion 92 shown in FIG. 8.

The demodulation-processing portion 92 corresponds to the correlation units 8-1 to 8-3, and acts to demodulate the data sent from a base station (not shown) according to the correlation outputs from the corresponding correlation units 8. As shown in FIG. 10, the demodulation-processing portion includes the functions of square calculators 92a, 92b, an adder 92c, a loop filter 92d, a voltage-controlled oscillator (VCO) 92e, a channel estimator 92f, a data demodulator 92g, and an AFC controller 92h.

The square calculator 92a takes the square of the value of the correlation output from the complex correlator 82-2 included in the corresponding correlation unit 8 and sends the result to the adder 92c. The square calculator 92b takes the square of the value of the correlation output from the complex correlator 82-3 included in the corresponding correlation unit 8 and sends the result to the adder 92c.

The adder 92c has a positive input terminal and a negative input terminal. The output value from the square calculator 92a is applied to the positive input terminal of the adder 92c, while the output value from the square calculator 92b is applied to the negative input terminal. The output value from the adder 92c is sent to the loop filter 92d.

The loop filter 92d removes RF components of the output from the adder 92c and suppresses oscillation due to feedback. The voltage-controlled oscillator 92e produces a signal to control the phase of the PN code generated by the PN code generator 83 included in the corresponding correlation unit 8 according to the output from the loop filter 92d.

The channel estimator 92f estimates the amplitude ρ and the phase θ of the wireless channel according to the correlation output from the complex correlator 82-4 included in the corresponding correlation unit 8, and sends the estimated amplitude ρ and the phase θ to the data demodulator 92g.

The data demodulator 92g demodulates the data according to the correlation output from the complex correlator 82-1 included in the corresponding correlation unit 8 while making a correction according to the amplitude ρ and the phase θ sent from the channel estimator 92f.

Figure 11:
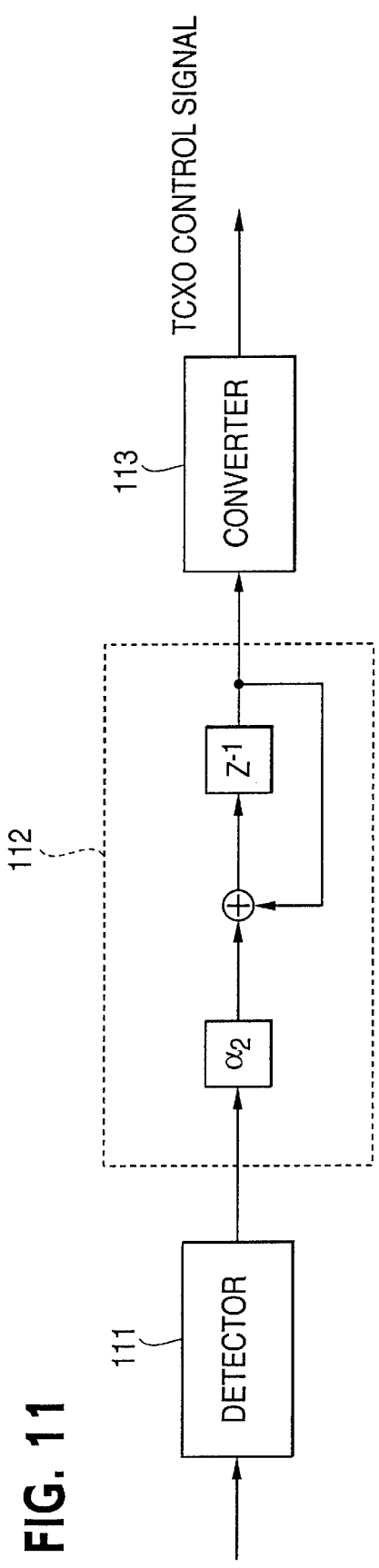
FIG. 11 is a schematic block diagram of an AFC controller 92$h$ shown in FIG. 10.

The AFC controller 92h comprises a frequency difference detector (ΔF detector) 111, a loop filter 112, and a TCXO signal converter 113, as shown in FIG. 11. This AFC controller 92h creates a reception frequency, or a TCXO control signal for adjusting the oscillation frequency of the synthesizer 22, according to the correlation output from the complex correlator 82-4 included in the corresponding correlation unit 8.

The symbol synthesizer 93 synthesizes data produced from the demodulation-processing portions 92 in synchronism and creates demodulated data undergone path diversity. Under this condition, the correlation unit 8-4 and the energy-calculating portion 91 realize the configuration of a well-known search receiver.

The correlation unit 8-1 and the demodulation-processing unit 92-1 together form an element of a well-known rake receiver. Similarly, the correlation unit 8-2 and the demodulation-processing portion 92-2 together constitute an element of a well-known rake receiver. The correlation unit 8-3 and the demodulation-processing portion 92-3 make up an element of a well-known rake receiver. Under this condition, the control portion 10 detects three PN code phases of strong signals, based on the pilot signal energy value found by the energy-calculating portion 91, and sets the correlation units 8-1, 8-2, and 8-3 at these PN code phases, respectively. Under this condition, a well-known rake reception is done. Thus, demodulated data undergone path diversity is obtained.

Figure 12:
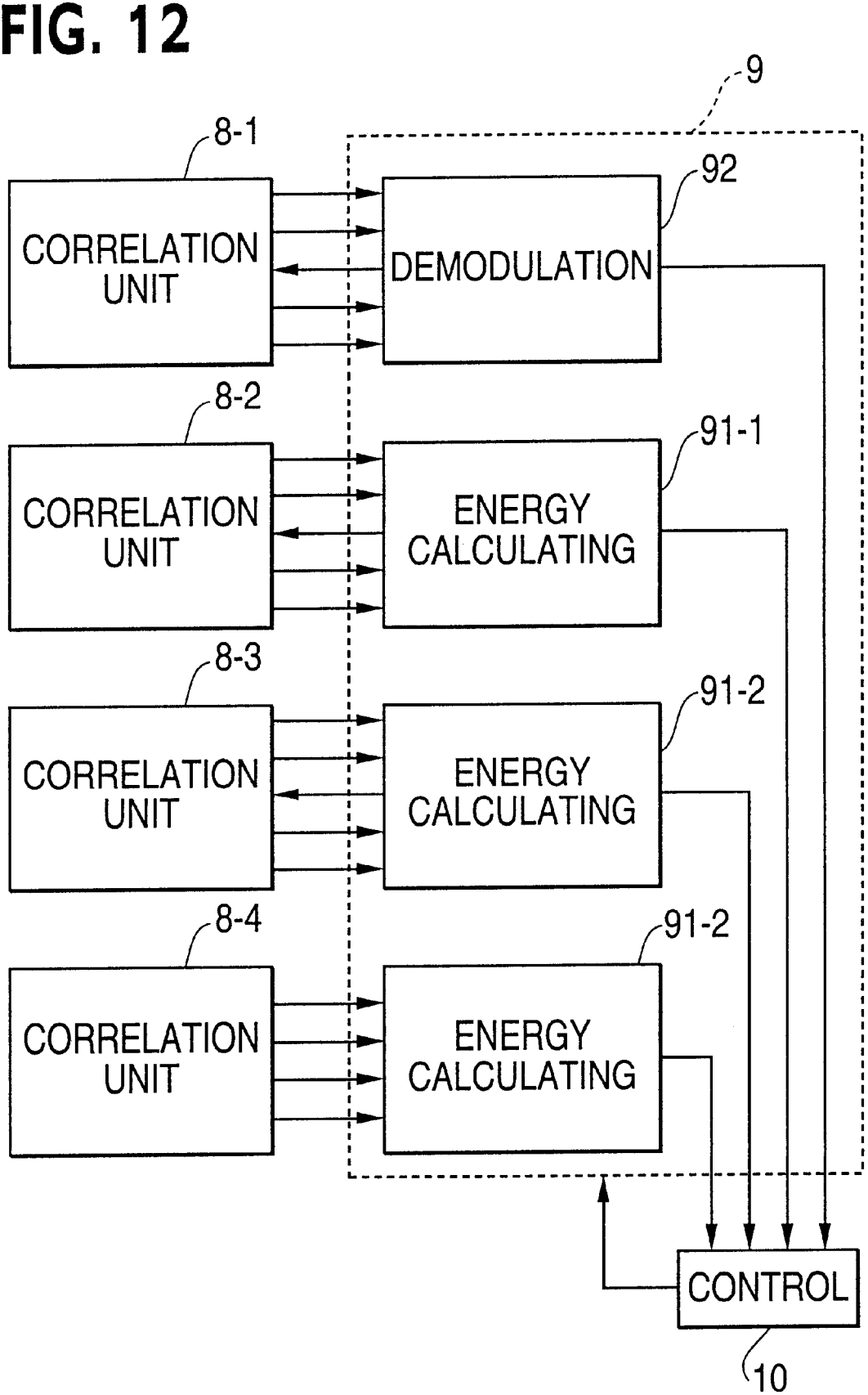
FIG. 12 is a block diagram of a configuration realized by the functions of the DSP 9 in a different frequency search mode.

On the other hand, the control portion 10 sets the mode of operation of the DSP 9 to the different frequency search mode while the reception frequency is f2. In this state, the DSP 9 functions as shown in FIG. 12. That is, once the different frequency search mode is established, the DSP 9 realizes the functions of three energy-calculating portions 91 (91-1, 91-2, 91-3) and the demodulation-processing portion 92.

Each of the three energy-calculating portions 91 has the structure shown in FIG. 9. The energy-calculating portions 91-1 receives the four correlation outputs from the correlation unit 8-2. The energy-calculating portion 91-2 receives the four correlation outputs from the correlation unit 8-3. The energy-calculating portion 91-3 receives the four correlation outputs from the correlation unit 8-4. These calculators find the energies of reception signals from these correlation outputs.

The demodulation-processing portion 92 is constructed as shown in FIG. 10, and performs clock tracking, provides a channel estimation, provides an AFC control, and demodulates data according to four correlation outputs from the correlation unit 8-1. Under this condition, the correlation unit 8-2 and the energy-calculating portion 91-1 cooperate to realize the configuration of a well-known search receiver. Similarly, the correlation unit 8-3 and the energy-calculating portion 91-2 realize the configuration of a well-known search receiver. The correlation unit 8-4 and the energy-calculating portion 91-3 realize the configuration of a well-known search receiver. The correlation unit 8-1 and the demodulation-processing portion 92 accomplish the configuration of a well-known rake receiver.

The correlation unit 8 has four complex correlators 82 to which data items that are successively shifted in phase by 0.5 chip are applied, respectively. Therefore, a set of correlation units 8 and energy-calculating portion 91 can conduct a search over a window length corresponding to 2 chips.

Accordingly, the control portion 10 shifts the phases of the PN codes generated by the PN code generators 83 of the correlation units 8-2, 8-3, and 8-4 by an amount corresponding to 2 chips. In total, the control portion conducts a search over a window length corresponding to 6 chips.

The time taken to conduct a search over a window length corresponding to 240 chips is 16.7 msec. The different frequency search over a window length corresponding to 240 chips is completed during the period of 1 frame in the different frequency search mode.

By constructing the three search receivers in this way, the different frequency search can be completed in the period of 1 frame. If another correlation unit 8 is used for a different frequency search, another frame becomes a MUTE frame.

Accordingly, in the present embodiment, the aforementioned rake receiver is built using the extra correlation unit 8-1 as described above. AFC (automatic frequency control), tracking, and AGC block operation are performed on signals of strong neighboring sets of signals with the frequency f2, using the rake receiver. These states are recognized by the control portion 10. Thus, preparations for a handoff are made.

In the demodulation-processing portion 92, a loop filter is contained in the AFC controller 92h, in addition to the loop filter 92d and the loop filter 112 included in the channel estimator 92f. Data cannot be demodulated correctly if the operation of these loop filters is not stable.

When the mode of operation of the DSP 9 is switched from the demodulation mode to the different frequency search mode, the control portion 10 stores the contents of the loop filters in a memory, a D type latch, or the like. After switching the mode of operation of the DSP 9 from the different frequency search mode back to the demodulation mode, the control portion 10 sets the loop filters to the states specified by the stored information. Consequently, the loop filters are restored to the states prior to switching to the different frequency search mode. Demodulation of data is quickly started.

In this way, in the present embodiment, a different frequency search over a window length corresponding to 240 chips can be completed within the period of 1 frame. Therefore, mute frames are produced discretely at the intervals of different frequency searches. Hence, quite short instantaneous interruptions occur simply discretely. This reduces auditory unnaturalness.

In accordance with the present embodiment, the time taken to perform a different frequency search over a window length across 240 chips is shorter than in the first embodiment described above and so where different frequency searches are carried out at the same intervals, more neighboring sets can be searched within the same period.

It is to be understood that the present invention is not limited to the embodiments described above. For example, in the above embodiments, a different frequency search is conducted at a rate of 1 frame every 5 frames. The different frequency search may be carried out at any desired intervals.

Furthermore, in the embodiments described above, frames in which the different frequency search is conducted are mute frames. Instantaneous interruptions can be eliminated by producing the voice of the previous frame repeatedly. This can further reduce the auditory unnaturalness.

Figure 13:
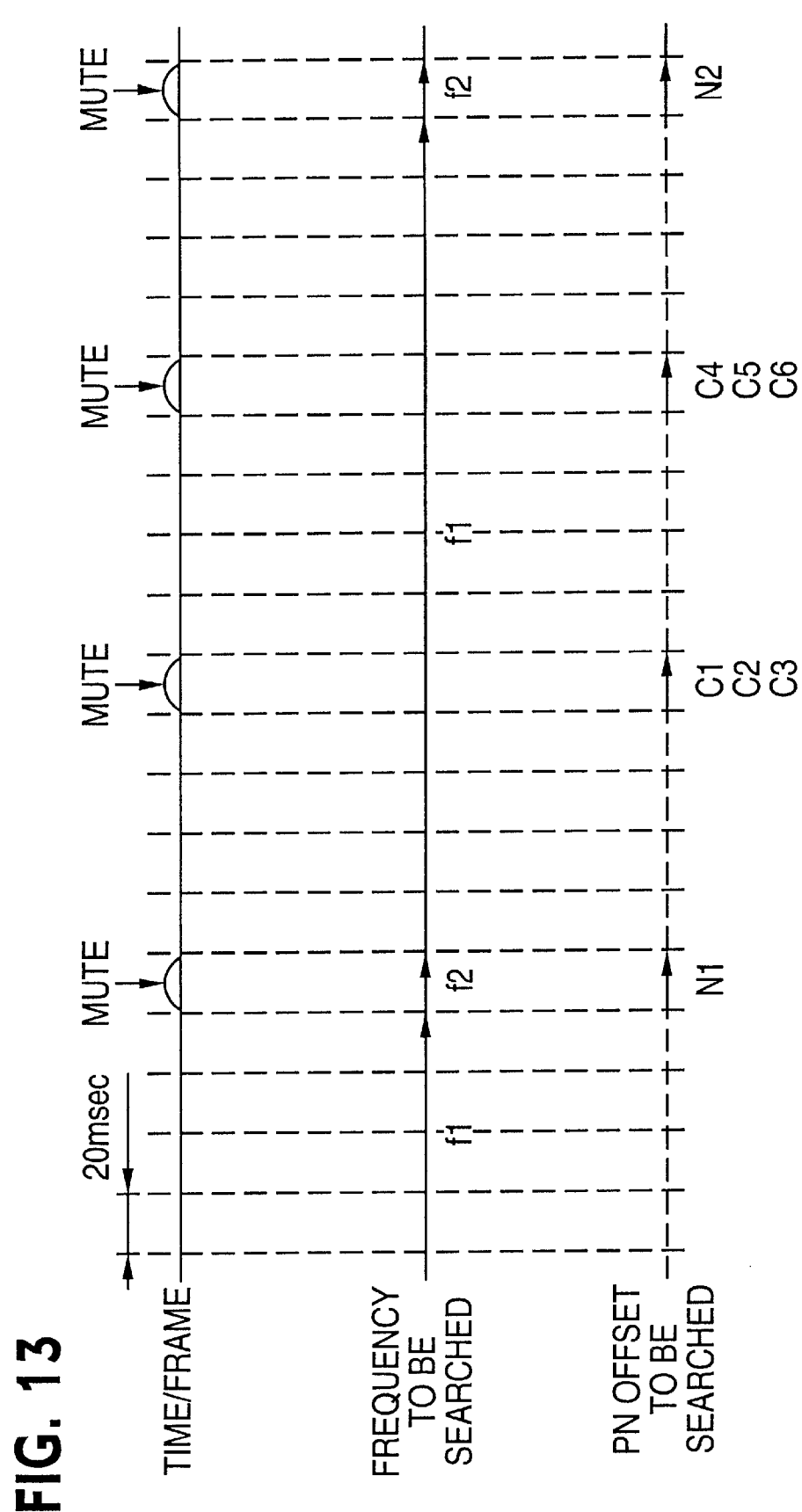
FIG. 13 is a diagram of a modification of the method of conducting a PN search in accordance with the second embodiment of the invention.
Figure 14:
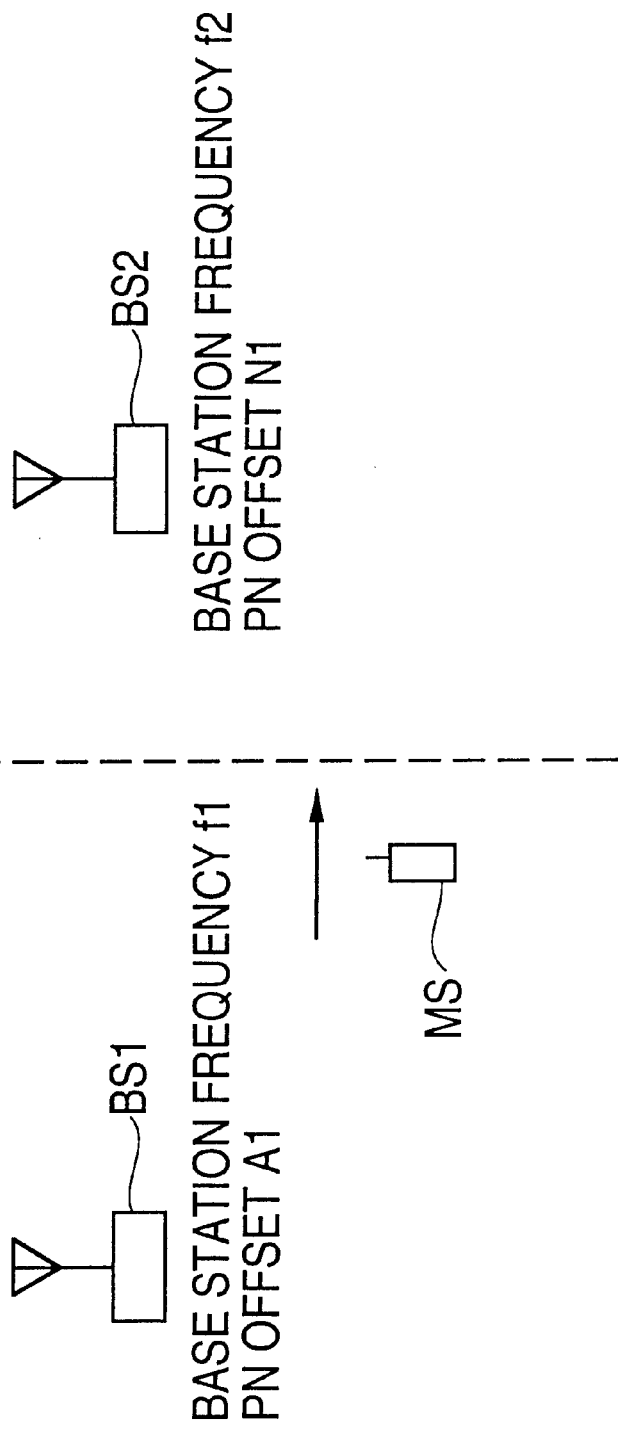
FIG. 14 is a diagram illustrating the necessity of the different frequency search.
Figure 15:
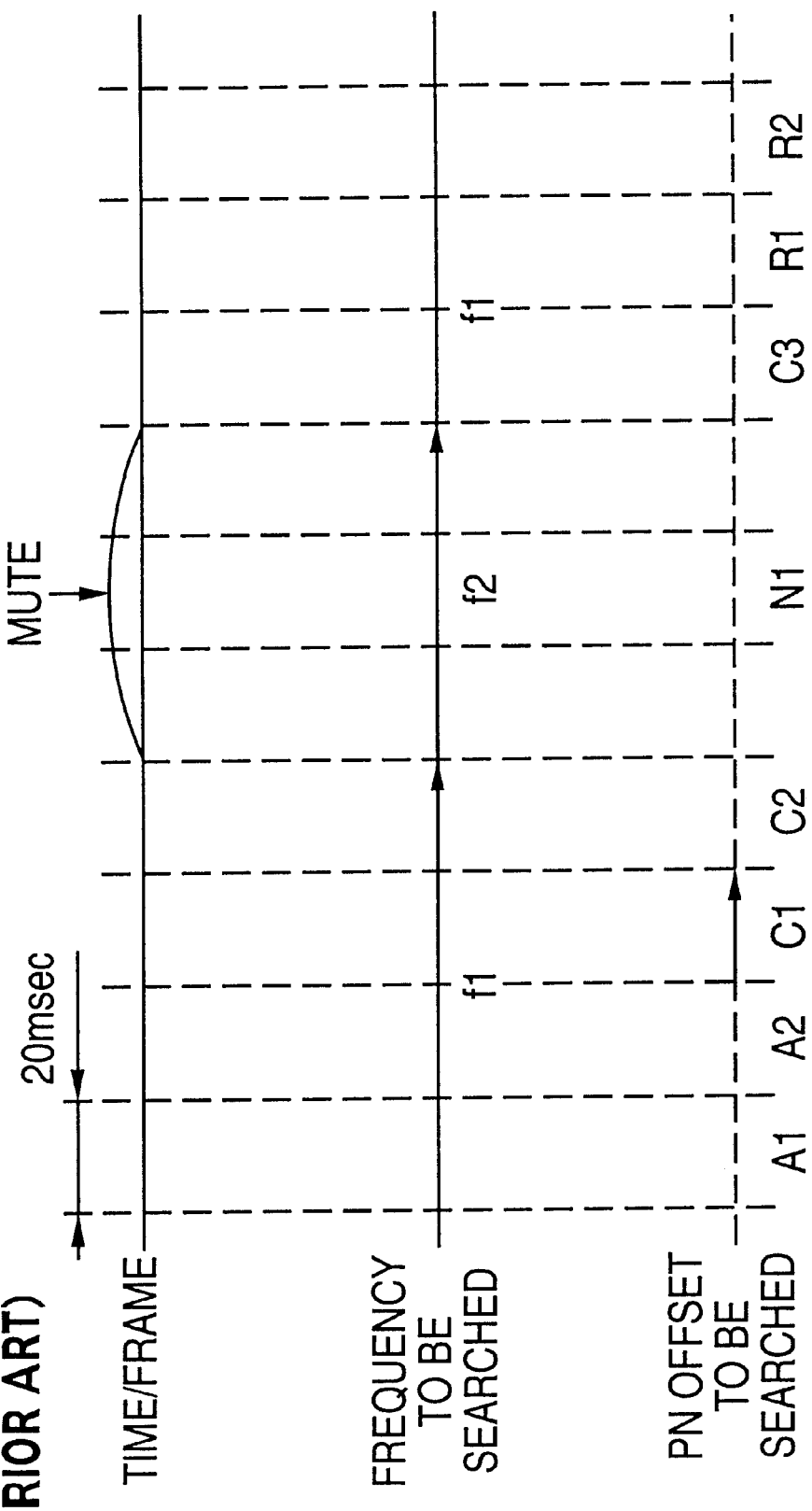
FIG. 15 is a diagram illustrating the manner in which a PN search is conducted by the prior art technique.

In the second embodiment described above, it may be necessary to search signals of plural candidate sets in a short time during reception of the frequency f1, because a mobile station is at the boundary between the coverage areas of base stations. In this case, as shown in FIG. 13, during a different frequency search, candidate sets can be intensively searched using three search receivers comprising correlation units 8-2, 8-3, 8-4 and energy-calculating portions 91-1, 91-2, 91-3, respectively. In the example of FIG. 13, six candidate sets C1, C2, C3, C4, C5, and C6 are searched during the periods of 2 mute frames. With this scheme, the candidate sets can be searched quickly. A soft handoff can be carried out efficiently.

Furthermore, in the second embodiment described above, the energy-calculating portion 91 and the demodulation-processing portion 92 are realized as functions of the DSP 9. They may also be implemented by random logic structures in the same way as the correlation unit 8, and they may be selectively connected with the correlation unit 8 with a selector. In addition, in the second embodiment, there are four correlation units 8. The number of the correlation units 8 may be arbitrary as long as it is two or more. Furthermore, in the second embodiment, during a different frequency search, three search receivers are built using three correlation units 8. The number of search receivers constructed during a different frequency search may be arbitrary as long as it is two or more. Further, various changes and modifications are possible within the scope of the present invention.

In accordance with one embodiment of the present invention, there is provided a spread spectrum wireless communications device used in a spread spectrum mobile communications system having a jumble of plural kinds of base stations using different frequencies, said spread spectrum wireless communications device comprising: a receiver means for receiving signals of a given frequency; a reception frequency control means; and a phase search means. The reception frequency control means controls the receiver means in such a manner that one is selected from plural consecutive frames such that frames not adjacent to each other are selected during communication. During the period of each selected frame, the receiver means receives a frequency different from a communication frequency used for the communication. The phase search means continually searches signals of the other frequency for pseudorandom code phases under control of the reception frequency control means, the signals of the other frequency being received intermittently by the receiver means. Therefore, it is possible to search for pseudorandom code phases over a window length longer than the frame length. Since the different frequency is received only during the period of 1 frame, the period during which the communication frequency cannot be received, i.e., during which voice communication is interrupted, is short. As a result, a pilot search of a frequency different from the traffic-channel frequency during a conversation can be conducted while suppressing deterioration of the voice quality.

In accordance with another embodiment of the present invention, there is provided a spread spectrum wireless communications device used in a spread spectrum mobile communications system having a jumble of plural kinds of base stations using different frequencies, said wireless communications device comprising: a receiver means for receiving signals of a given frequency; plural correlation-calculating means for producing correlation signals, respectively, according to degrees of correlations of at least four kinds of pseudorandom codes with a signal received by said receiver means, said four kinds of pseudorandom codes having the same contents but different phases; plural energy-calculating means for calculating a reception energy from a correlation signal produced from the connected one of said correlation-calculating means, the reception energy being determined by a pseudorandom code phase used to obtain said correlation signal; plural demodulation-processing means including a clock-tracking means including a loop filter and acting to control a pseudorandom code phase used by the connected correlation-calculating means according to given first and second correlation signals produced from the connected correlation-calculating means, a channel-estimating means including a loop filter and acting to estimate a given state regarding a received wireless channel from a given third correlation signal produced from the connected correlation-calculating means; a frequency control means including a loop filter and for finding a frequency shift based on said third correlation signal produced from the connected correlation-calculating means and for creating information for correction, and a dara demodulating means for demodulating data based on a given fourth correlation signal produced from the connected correlation-calculating means and on the state estimated by said channel-estimating means; an operation mode-switching means; a phase search means; and a loop filter control means. One is selected from plural frames such that selected ones are not adjacent to each other. During periods of frames other than these selected frames, the operation mode-switching means connects said energy-calculating means with one of the correlation-calculating means and connects said demodulation-processing means with the remaining correlation-calculating means. During the periods of the selected frames, the operation mode-switching means connects said energy-calculating means with plural ones, respectively, of said correlation-calculating means. During the periods of the selected frames, the phase search means causes said correlation-calculating means with which said energy-calculating means are connected to use given sought pseudorandom codes with different phases. At this time, the phase search means searches for pseudorandom code phases to be sought according to reception energies found by said energy-calculating means connected with said correlation-calculating means. The loop filter control means detects the states of loop filters of said clock-tracking means, channel-estimating means, and frequency control means arranged in said plural demodulation-processing means, respectively, when the period of any one of said selected frames begins. The detected states are stored in memory. When the period ends, the stored states of the loop filters are restored.

In this embodiment of the invention, the reception frequency control means is provided to control said receiver means to receive a frequency different from the communication frequency used for communication during the periods of said given frames. Said phase search means searches for pseudorandom codes of neighboring sets during the periods of said given frames. As a result, a pilot search of frequencies different from the traffic-channel frequency during conversation can be conducted while suppressing deterioration of voice quality.

In the present invention, the aforementioned phase search means searches for pseudorandom codes of a candidate set connected with the energy-calculating means during the periods of the selected frames, the candidate set being different for each different correlation-calculating means. Therefore, a pilot search of numerous candidate sets can be completed in a short time.

What is claimed is:

1. A spread spectrum wireless communications device used in a spread spectrum mobile communications system having base stations using different frequencies, said wireless communications device comprising:

receiving means capable of receiving a first signal transmitted over a first frequency by a first base station and a second signal transmitted over a second frequency by a second base station;

search receiver means for performing a search of pseudorandom code phases of the second signal a plurality of times, one search being performed over a plurality of frames; and control means for selecting the plurality of frames for said one search, each of the selected frames being separated in time from each other, controlling said receiving means to repeat receiving the first signal during a time period other than during the selected frames and the second signal during one of the selected frames until the second signal is received for the plurality of frames, and controlling said search receiver means to perform a part of said one search during said one of the selected frames and complete said one search when the second signal is received for the plurality of frames.

2. The device according to claim 1, further comprising: calculating means for calculating an energy for the second signal.

3. The device according to claim 2, wherein the search receiver means searches the phase of the pseudorandom code of the second signal in response to the calculated energy of the second signal.

4. The device according to claim 1, further comprising:
    demodulating means for demodulating the first signal;
    storing means for storing one or more characteristics of the demodulating means before said one of the selected frames starts; and
    setting means for setting a state of the demodulating means to the stored characteristics after said one of the selected frames ends.

5. A spread spectrum wireless communications device used in a spread spectrum mobile communications system having base stations, each base station broadcasting signals spread by a pseudorandom code over a frequency, said wireless communications device comprising:

a receiver configured to receive signals in first and second modes, in the first mode the receiver receiving first signals transmitted over a first frequency by a first base station, in the second mode the receiver receiving second signals transmitted over a second frequency by a second base station;

a search receiver configured to search phases of a pseudorandom code of the second signals a plurality of times, one search being performed over a plurality of frames; and a controller configured to select the plurality of frames for said one search, each of the selected frames being separated in time from each other, to control the receiver to repeat receiving the first signals during a time period other than during the selected frames and the second signals during one of the selected frames until the second signals are received for the plurality of frames, and to control the search receiver to perform a part of said one search during said one of the selected frames and complete said one search when the second signals are received for the plurality of frames.

6. A method of operating a spread spectrum wireless communications device used in a spread spectrum mobile communications system having base stations using different frequencies, the device including a receiver capable of receiving a first signal transmitted over a first frequency by a first base station and a second signal transmitted over a second frequency by a second base station, and a search receiver for performing a search of pseudorandom code phases of the second signal a plurality of times, one search being performed over a plurality of frames, said method comprising:

selecting the plurality of frames for said one search, each of the selected frames being separated in time from each other;

controlling said receiver to repeat receiving the first signal during a time period other than the selected frames and the second signal during one of the selected frames until the second signal is received for the plurality of frames; and controlling said search receiver to perform a part of said one search during said one of the selected frames and complete said one search when the second signal is received for the plurality of frames.

7. The method according to claim 6, further comprising calculating an energy for the second signal.

8. The method according to claim 7, further including searching with said search receiver the phase of the pseudorandom code of the second signal in response to the calculated energy of the second signal.

9. The method according to claim 6, further comprising:
    demodulating the first signal;
    storing one or more characteristics of the demodulation before said one of the selected frames starts; and
    setting a state of the demodulation to the stored characteristics after said one of the selected frames ends.

10. A method of operating a spread spectrum wireless communications device used in a spread spectrum mobile communications system having base stations, each base station broadcasting signals spread by a pseudorandom code over a frequency, the device including a receiver configured to receive signals in first and second modes, in the first mode the receiver receiving first signals transmitted over a first frequency by a first base station, in the second mode the receiver receiving second signals transmitted over a second frequency by a second base station, and a search receiver configured to search phases of a pseudorandom code of the second signals a plurality of times, one search being performed over a plurality of frames, said method comprising:

selecting the plurality of frames for said one search, each of the selected frames being separated in time from each other;

controlling the receiver to repeat receiving the first signals during a time period other than the selected frames and the second signals during one of the selected frames until the second signals are received for the plurality of frames; and controlling the search receiver to perform a part of said one search during said one of the selected frames and complete said one search when the second signals are received for the plurality of frames.

11. A spread spectrum wireless communications device used in a spread spectrum mobile communications system having base stations using different frequencies, said wireless communications device comprising:

receiving means for receiving signals transmitted over a first frequency by a first base station in a first period, and for receiving signals transmitted over a second frequency by a second base station in a second period other than the first period, the second period corresponding to a plurality of selected frames, each of the selected frames being separated in time from each other;

correlating means having a plurality of correlation sections, each correlation section capable of correlating the signals with a pseudo noise code having a phase;

processor means having a plurality of processing sections, each processing section capable of performing a demodulation of the signals correlated by a corresponding one of the correlation sections and an energy calculation of the signals correlated by a corresponding one of the correlation sections; and control means for controlling at least one of the processing sections to perform the demodulation of the signals over the first frequency during the first period, and for searching phases of the pseudo noise code of the signals over the second frequency during the second period by controlling said at least one of the processing sections to perform the energy calculation of the signals.

12. The device according to claim 11, wherein the processor means further includes:

storing means for storing one or more characteristics of the demodulation before each one of the selected frames starts; and setting means for setting a state of the demodulation to the stored characteristics after each one of the selected frames ends.

13. A method of operating a spread spectrum wireless communications device used in a spread spectrum mobile communications system having base stations using different frequencies, the device including a receiver for receiving signals, a correlation unit for an energy calculation of the signals correlated by a corresponding one of a correlation sections having a phase, and a processor having a plurality of processing sections, each processing section capable of performing a demodulation of the signals correlated by a corresponding one of the correlation sections, the method comprising:

controlling the receiver to receive signals transmitted over a first frequency by a first base station in a first period, and to receive signals transmitted over a second frequency by a second base station in a second period other than the first period, the second period corresponding to a plurality of selected frames, each of the selected frames being separated in time from each other;

controlling at least one of the processing sections to perform the demodulation of the signals over the first frequency during the first period; and searching phases of the pseudo noise code of the signals over the second frequency during the second period, by controlling at least one processing sections to perform an energy calculation of the signals correlated by a corresponding one of the correlation sections in addition to using the correlation unit, at least on processing sections capable of performing the energy calculation of the signals.

14. The method according to claim 13, storing one or more characteristics of the demodulation before each one of the selected frames starts; and setting a state of the demodulation to the stored characteristics after each one of the selected frames ends.

* * * * *